UNITED STATES PATENT OFFICE.

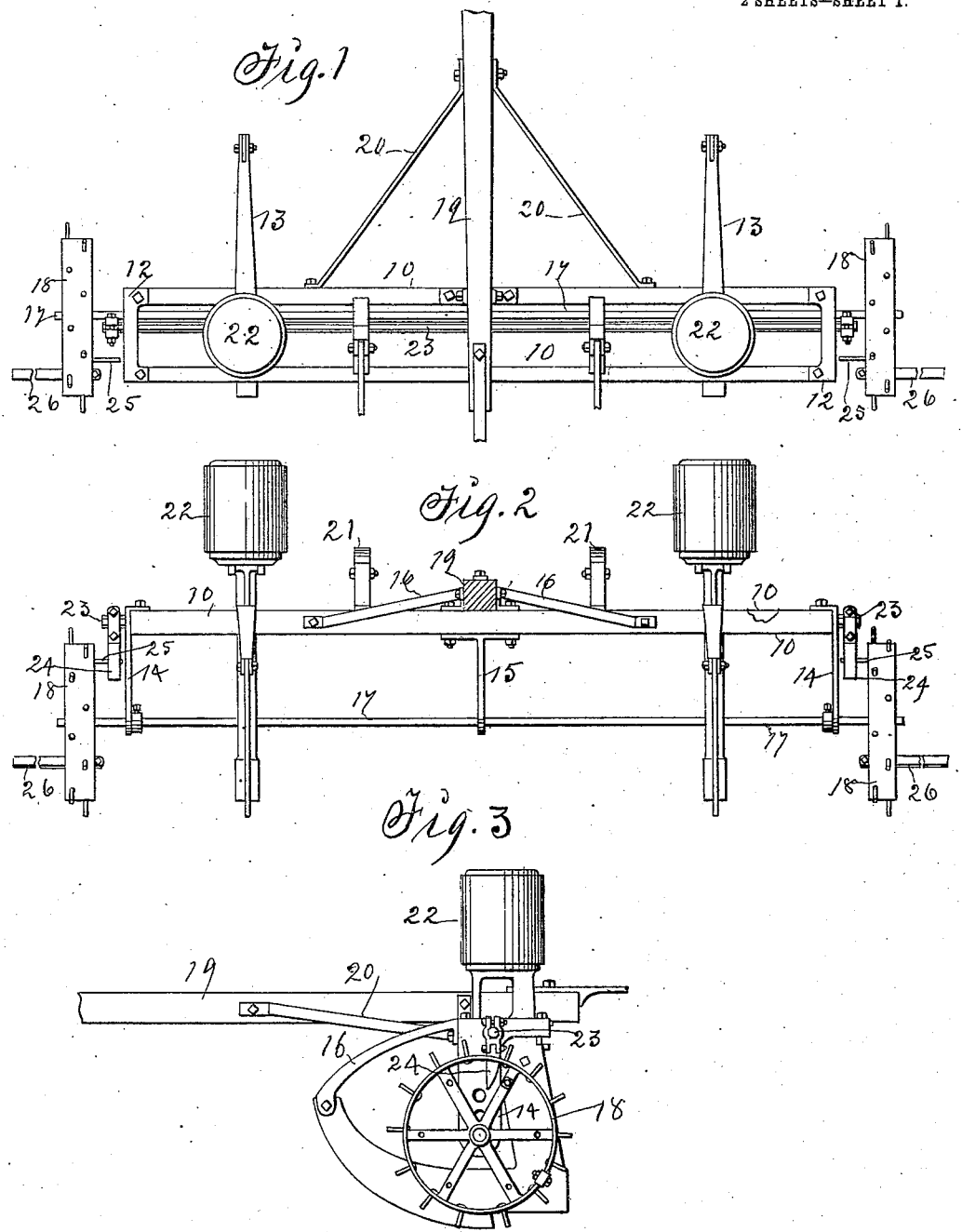

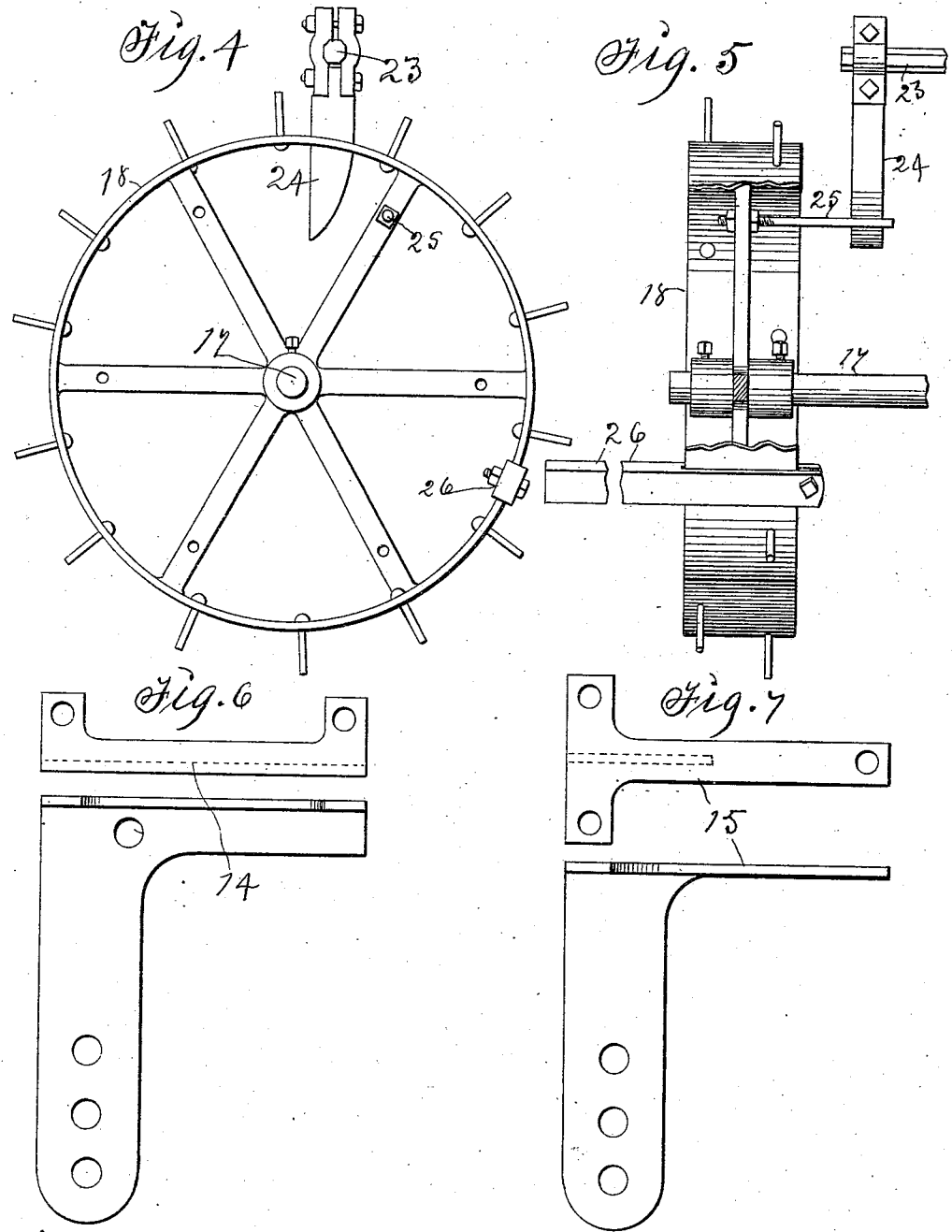

ELLSWORTH ROBINSON, OF KELLOGG, IOWA.

CHECK-ROW CORN-PLANTER.

No. 855,435.     Specification of Letters Patent.     Patented May 28, 1907.

Application filed February 24, 1906. Serial No. 303,068.

*To all whom it may concern:*

Be it known that I, ELLSWORTH ROBINSON, a citizen of the United States, residing at Kellogg, in the county of Jasper and State of Iowa, have invented a new and useful Check-Row Corn-Planter, of which the following is a specification.

My object is to provide an attachment for corn-planters to automatically mark the ground for guiding the movement of the planter in return trips across a field as required to produce check rows.

My invention consists in the construction, arrangement and combination of marking mechanism and a rotary shaft for intermittently actuating valves in seed boxes for dropping seeds at regular intervals of time and space, as the planter is advanced, as hereinafter set forth, pointed out in my claims and illustrated in the accompanying drawings in which:—

Figure 1 is a top view of the front carriage and furrow opener of a corn planter of common form and shows the positions of the different parts of my attachment relative to each other and the carriage and Fig. 2 is a front view of the same. Fig. 3 is a side elevation of the carriage a wheel connected therewith carrying a marker and shows the device for imparting intermittent motions to the shaft for actuating seed valves in seed boxes. Fig. 4 is an enlarged side view and Fig. 5 a rear view of the wheel carrying a marker and the shaft actuating device. Fig. 6 illustrates one of the brackets for supporting the wheels that carry markers and the rotary shaft for actuating valves in seed boxes and Fig. 7 shows a bracket adapted to be fixed to the center of the cross bar or bench of the carriage to aid in supporting the rotary shaft to which the marker wheels are fixed.

The numerals 10 designate the two parallel cross bars and 12 the ends of the frame to which the runners 13 are fixed under its end portions.

Brackets 14 are fixed to the end portions of the cross bars 10 and a third bracket 15 is fixed to the center of the frame, as shown in Fig. 2. They are provided with bearings for a rotatable shaft. Braces 16 are pivoted to the front ends of the runners and fixed to the front cross bar 12. A rotatable shaft 17 is extended through the bearings in the fixed brackets 14 and 15 and wheels 18 for actuating the shaft and carrying markers are fixed to the ends of the shaft. A pole 19 is fixed on the top and centers of the cross-bars 10 and braces 20 fixed to the pole and cross bars as shown in Fig. 1. Uprights 21 are fixed on top of the frame for connecting a rear carriage with the frame.

Seed boxes 22 are fixed on the end portions of the frame. A shaft 23 is mounted under the frame in bearings in the brackets fixed to the frame and provided with angular ends to which are clamped cams 24 to be engaged at each revolution of the wheels 18 by pins 25 projecting inward from the wheels, as shown in Fig. 5, to rock the shaft 23 as required to thereby impart intermittent motions to valves in the seed boxes but not shown.

Markers 26 consisting of straight metal bars bifurcated at one end, as shown in Fig. 5, are clamped to the rims of the wheels 18, or otherwise fixed there to project outward as required to press marks in the loose ground at each revolution of the wheels in such a manner that when the planter has made a trip across the field and is turned about to make a return trip the markers will make marks in alinement with those made previously and at the same time the shaft 23 is rocked as required for actuating valves in the seed boxes to drop seeds in two parallel rows, at regular distances apart, as required to produce check rows.

It is obvious the spaces between the rows will be governed by the spaces between the runners and the seed boxes on their tops and the diameters of the wheels.

By fixing two pins 25 in each wheel the seeds will be dropped twice from each seed box at each revolution of a wheel 18 and by fixing four pins to each wheel the seeds will be practically planted in rows in the manner of drilling machine.

Having thus set forth the purposes of my invention and the construction and functions of the different elements and the arrangement and combination of all the different parts the practical operation and utility thereof will be readily understood by those familiar with the art to which the invention pertains.

What I claim as new and desire to secure by Letters-Patent, is:—

1. An automatic attachment for corn-planters to produce check-rows comprising brackets fixed to the carriage frame to project downward, a rotatable shaft mounted on the brackets, traction wheels fixed to the ends of the shaft, markers fixed to the wheels to project outward, a second shaft parallel with the first mentioned shaft, cams on the ends of the second shaft and means to actuate the cams at each revolution of the wheels, arranged and combined to operate as set forth.

2. An automatic attachment for cornplanters to produce check rows, comprising a rotatable shaft mounted under the front carriage frame, traction wheels fixed to the ends of the shaft, markers fixed to the wheels to project outward, a second shaft mounted under the carriage frame, cams on the ends of the said shaft and means to actuate the same at each revolution of the wheels, arranged and combined to operate in the manner set forth, for the purposes stated.

ELLSWORTH ROBINSON.

Witnesses:
HERMAN HANSON,
B. J. ENGLE.